May 2, 1967

W. DE SORBO 3,317,286

COMPOSITE SUPERCONDUCTOR BODY

Filed Nov. 2, 1961

Inventor:
Warren De Sorbo,
by Charles J. Watts
His Attorney.

United States Patent Office 3,317,286

Patented May 2, 1967

3,317,286

COMPOSITE SUPERCONDUCTOR BODY

Warren De Sorbo, Ballston Lake, N.Y., assignor to General Electric Company, a corporation of New York Filed Nov. 2, 1961, Ser. No. 149,590
4 Claims. (Cl. 29—183.5)

Figures 1, 2, 3:
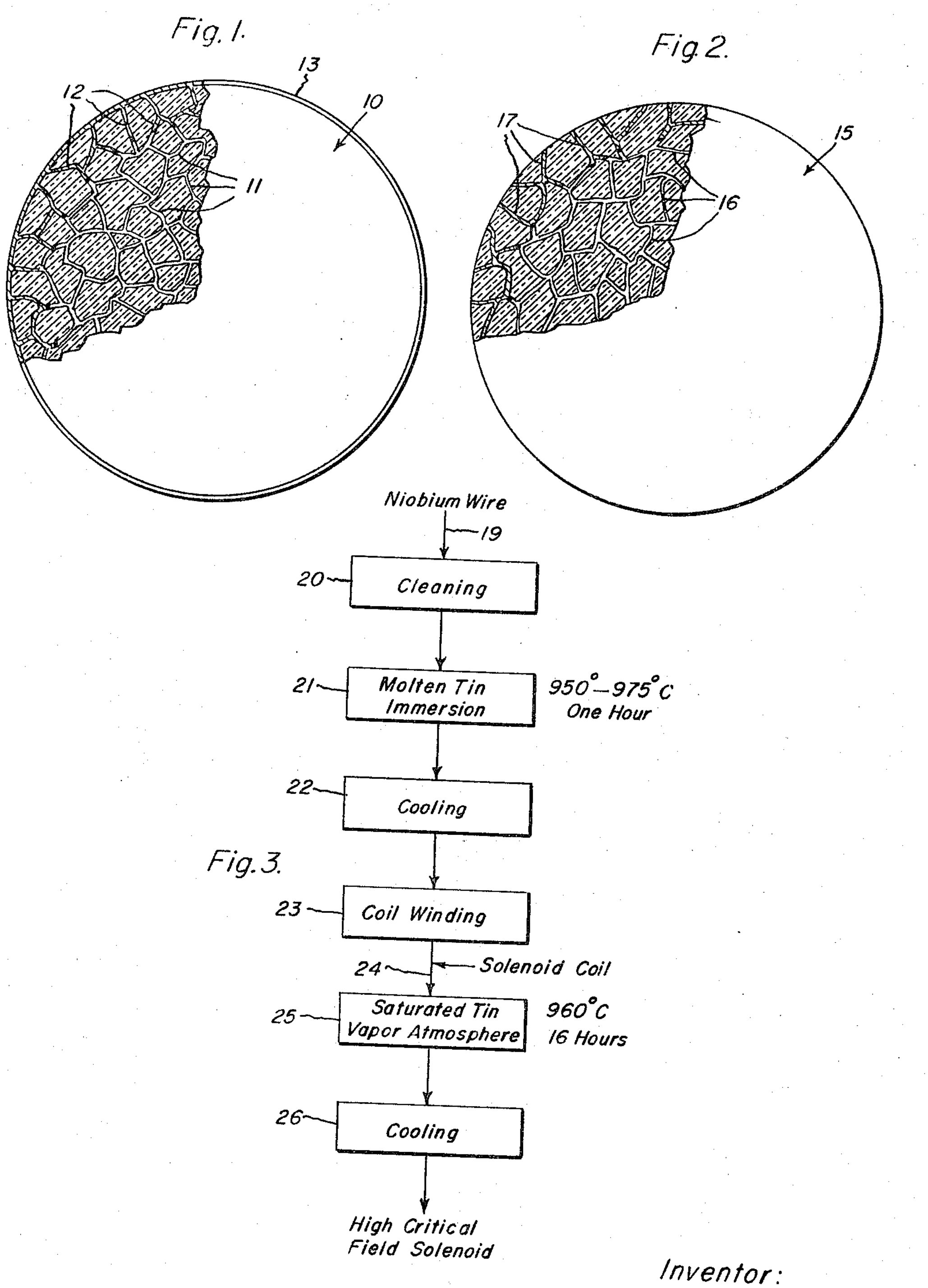

This invention relates to superconductors and more particularly to novel superconductive bodies capable of withstanding high current losslessly, and to a new method for producing these bodies.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems involved in extremely low temperature operations.

As is well known, "superconduction" is a term describing the type of electrical current conduction existing in certain materials cooled below a critical temperature, $T_c$, where resistance to the flow of current is essentially nonexistent. Like a normal conductive material, a superconductive material, that is, any material having a critical temperature, $T_c$, below which normal resistance to the flow of electrical current is absent, can be subjected to an applied magnetic field when cooled below $T_c$ and a current will be induced therein. The current in the superconductive material, however, even with the removal of the applied magnetic field, will theoretically continue for an infinite time and is therefore called "supercurrent" to distinguish it from the usual current present at temperatures above the critical temperature, $T_c$, but supercurrents will exist in those materials classified as "soft" superconductors only if a geometry is provided which has multiply-connected surfaces as opposed to a simply-connecter surface, and the applied magnetic field is below a critical magnetic field, $H_c$. A solid cylinder is an example of a simply-connected body, and a cylinder having an axial bore or a hollow sphere are examples of multiply-connected bodies. In the case of "hard" superconductors, supercurrents will exist without regard to the geometry of the body, since they are inherently multiply-connected. Here, assuming the low temperature requirement which is present in all cases, the applied magnetic field need only be below the critical field, $H_c$.

The terms "hard" and "soft," as applied to superconductors, originally referred principally to these physical properties of the materials. Subsequently, however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a sub-critical magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically-reversed applied magnetic field.

Soft magnetically superconductive bodies are, by way of comparison, composed of materials which are not inherently magnetically hard and which have only a simply-connected surface. If a soft superconductive material is shaped in solid cylindrical form, the superconductive body is soft. If, on the other hand, the same soft material is shaped into hollow cylindrical form, the resulting superconductive body may be classified as hard, since it will trap flux.

The discussion thus far has omitted any reference to another factor which is to some degree responsible for the lack of use of superconductive bodies where the trapped magnetic flux is the element sought. This factor is the amount of supercurrent and contemporaneous trapped magnetic flux which can be obtained. The applied magnetic field to which a superconductive body is subjected begins to penetrate the skin or surface of the body and immediately creates a supercurrent which precludes the further penetration of the body. This is known as the Meissner effect. The depth of flux penetration that was felt to be possible in view of the Meissner effect was increased somewhat by the development of a theory by F. and H. London which states that the degree of flux penetration is a factor of the current density. The London theory envisioned current densities in a gross superconductor which decreased in magnitude from the outside toward the inside of the body. The result has been that the flux penetration depth of a given superconductive material is given in terms of the London penetration depth. $\lambda$. However, since the penetration depth $\lambda$ is exceedingly small, for example, less than about 1000 A. in the best materials, it has not been possible to improve the quantity of trapped flux in gross superconductive bodies. An increase in the magnitude of the applied magnetic field does not extend the limit, since this limit is fixed at the critical field, $H_c$, which results in the creation of a critical current, $I_c$, in the surface of the superconductor and drives it normally resistive, or non-superconducting.

It has been found that hard superconductive bodies possess higher critical fields, $H_c$, than soft superconductive bodies and available evidence increasingly supports the proposition that the higher critical fields, and therefore higher current densities, are manifestations of the microstructure in hard superconductive bodies. Specifically, the magnetic properties of high critical field superconductors are felt to inhere from what may be described as a fine filamentary mesh which pervades the bodies. Such a mesh provides connectivity that has an extremely high multiplicity. Since the filaments are thinner than the penetration depths of a gross superconductive body, they will remain superconductive in the presence of externally applied magnetic fields which exceed the critical field of the gross superconductive body. This fact, of course, raises the critical current density, $J_c$, and enables larger currents to flow losslessly in the bodies.

I now believe that flux penetraton in high critical field bodies differs from that for gross or bulk superconductors in that such penetration increases with a decrease in superconductor thickness or diameter. This relationship is indicated by the expression $$\lambda=\lambda_L\left(\frac{E_0}{D}\right)^{1/2}$$

where $\lambda$ is the penetration depth
$\lambda_L$ is the London penetration depth
$E_0$ is the coherence distance which ranges from about 1000 A. to 10,000 A., and
D is the thickness of the superconductive filament.

The striking result of this general concept is that the magnetization of a filamentary superconductor depends upon the macroscopic dimensions of the sample, this being a feature that was heretofore contraindicated.

With this background, the nature of the present invention and my surprising discoveries upon which this invention is predicated, may be more fully comprehended and appreciated by those skilled in the art. In accordance with this invention, superconductors can be produced readily and economically by a process which yields consistently high quality products. Further, superconductors having uniquely high current carrying capacity can be made in the forms and sizes desired and this can be done using materials meeting the economic and convenience requirements of the manufacturer. Still further, this invention holds the advantages that it does not require either special expensive production equipment or close processing control.

In making this invention, I discovered that if a wire or similar article of niobium is subjected to contact with tin vapor under certain critical time and temperature circumstances, the current carrying capacity of the conductor in the superconducting temperature ranges will be surprisingly great. I have further found that generally the same result can be obtained where the wire or article is immersed in molten tin for somewhat shorter periods but that there typically does not appear to be the filamentary network formation characteristic of the foregoing vapor deposition procedure. In addition, I have discovered that an even further substantial increase in current carrying capacity can be achieved by combining these two procedures, both surface film or sheath and filamentary network structures being well developed in the final product. If the niobium body, such as a wire is wound to produce a coil at the intermediate stage between the vapor deposition step and the dipping step, an additional substantial increase in this capacity can be obtained. Apparently, a densification of the superconducting filaments of a second phase of tin or tin-niobium alloy or intermetallic compound which are produced within at least a superficial portion of the niobium wire occurs during these operations, and in the latter two cases, a superconducting film of tin or tin alloy or intermetallic compound is formed as a sheath-like film on the wire and augments the current carrying capacity of the superconducting filamentary network. I believe, however, that a greater effect is obtained as a result of the breaking of individual elements or threads of the networks followed by repair of these threads and the simultaneous formation of additional threads which enlarge the network and increase the density of the second phase within the niobium body or matrix. In other words, its is a packing action which is produced and the resulting body has a much higher current carrying capacity as a direct result of the increased number of network units per unit of the niobium body or matrix.

Another discovery I have made is that aluminum can be substituted for tin in producing superconducting filamentary networks and coatings of high current carrying capacity in niobium wires. But again, it is not yet clear whether it is the aluminum in elemental form or niobium-aluminum alloy or intermetallic compound which is only or mainly responsible for these results. In any event, the coatings and filamentary networks are made up of a second phase which can only be produced in the form, location and dimension essential to the foregoing new results and properties by methods subsequently to be described herein and based upon and incorporating my discoveries set forth above.

In accordance with an additional discovery, the articles of this invention contain a minor amount of zirconium, with the result that the current carrying capacity $J_c$, invariably is unpredictably higher than it otherwise would be.

While the precise role of the zirconium in synergetically producing this result is not definitely known, I have envisioned the possibility of obtaining generally similar results through the use of other additives in minor amounts in niobium to be processed in accordance with this invention. In fact, I have qualitatively confirmed the utility and value of carbon as an equivalent to zirconium in this respect and I contemplate using indium as well. Also, I contemplate, in view of these discoveries, the use of two or more of these minor constituents together to obtain these new results.

I have also found that it is preferable in carrying out this invention to cold work the wire or other niobium article prior to subjecting it for the first time to contact with the tin or aluminum vapor or melt. This requirement, however, can be met in a variety of ways as, for example, by sanding, sandblasting, drawing or shaving the wire, or by rolling it if it is in the form of a ribbon.

These and other special features and advantages of this invention may be more fully understood and appreciated upon consideration of the detailed description of preferred embodiments set out below, reference being had to the drawings accompanying and forming a part of this specification in which, FIGURE 1 is a greatly magnified fragmentary cross-sectional view of a wire or strand of this invention;

FIGURE 2 is a view like that of FIG. 1 showing another wire which however has no outer coating of superconducting film in addition to an internal filamentary network of superconducting material; and, FIGURE 3 is a flow sheet of a preferred method of this invention.

In its method concept, this invention generally comprises the step of contacting the body of niobium with tin in the temperature range from 800° C. to 1100° C. until a deposit is established on and or within a superficial portion of the body, this operation being carried out under a suitable neutral or protective atmosphere. More in detail, this method preferably includes the preliminary step of cleaning the surface of the niobium body to be contacted with the tin and removing therefrom all dirt, organic material and loose particles, as well as any coatings bonded to the niobium body, such as niobium oxide, which would impair or prevent the formation of the desired adherent deposits.

In another preferred embodiment of this invention, the niobium body, following surface preparation and cleaning, is subjected to contact with tin vapor and after a period sufficient to permit diffusion of tin vapor into pores of the body, and the formation of deposits therein. The body is then immersed in molten tin. A sheath or coating is thus provided in addition to the second phase tin-containing or tin filaments supported by at least the outer portion of the body and, if desired, distributed through deeper recesses of the body. As previously indicated, an intermediate coil-winding step is preferably carried out following the vapor deposition step, with the resultant enhancement of the current carrying capacity of the final product through fracture and repair of the filaments and formation of new filaments, according to my hypothesis set out above.

The temperature of the niobium work-piece during both the vapor deposition procedure and the immersion coating operation will be within the range from 800° C. to 1100° C. and preferably will be between 950° C. to 975° C. However, in the vapor deposition step the time factor will be somewhat greater, running from 5 to 100 hours and preferably approximating 16 hours, while only a matter of 30 seconds to 2 hours ,preferably one hour, is taken for the immersion coating step. The mass or size of the niobium body should be considered in determining optimum temperature and time circumstances when filaments rather than films are to be produced, and generally for the same result in terms of desired properties, a longer time will be required where the average temperature during the process is in the lower portion of the aforesaid range.

When it is merely desired to "tin" niobium and there is no necessity for producing a substantial structure for carrying superconducting currents, it will not be necessary or usually desirable to carry out a preliminary special cold working operation. The bonding of tin in the molten tin dipping operation will be just as effective whether or not the cold working operation has been carried out and whether or not the niobium body has been first subjected to contact with tin vapor. The essential of this "tinning" procedure is maintaining of the surface of the niobium body in contact with the molten tin for the critical time and at the critical temperature previously indicated and subsequently to be described in further detail. It is preferable, however, to thoroughly clean the surface to be coated in this manner so as to remove all adhering dirt and oxide coating and the like which would interfere with the coating action.

In its article aspect, the present invention, broadly described, comprises a niobium body bearing a deposit of tin in the form in whole or in part of elemental tin or a chemical combination, i.e. a chemical union of tin and niobium as a compound or an alloy of niobium. But while it has yet to be established precisely in what form the tin or tin-containing deposits produced in accordance with the methods above described exist in these new products, it is clear that a second phase is formed in the course of exposure of the niobium body to tin vapor or melt under the above critical conditions. The resulting deposit containing or comprising tin may be either in the form of a continuous filamentary network within the niobium body or in the form of a film on the surface of the body, or it may be a combination of both these types.

This invention also contemplates an article comprising a niobium body containing a minor amount of zirconium and supporting a deposit of a relatively small amount of a second phase of tin in chemical union with niobium. Aluminum may be substituted for tin, and carbon indium, titanium, hafnium, vanadium, molybdenum, tungsten and tantalum may be substituted for zirconium in whole or in part, as generally indicated above. More in detail, however, the zirconium content of the niobium body, preferably in the form of a strand, wire, ribbon or the like, will be of the order of from 0.1 percent by weight of the niobium mass to an amount equivalent to the ratio represented by the formula $Nb_2Zr$. Carbon, indium and other additives stated above will be used in similar amount, and where two or more of these minor constituents are employed, the aggregate will preferably not exceed the aforesaid stoichiometric ratio.

In one preferred form of the article of this invention, the tin is provided as a coating or sheath on the article and preferably it is of thickness of the order of 500 A. or less over a major proportion of its area. Also, this sheath will extend over at least a portion of the axial length of the niobium body and preferably will enclose that portion of the body. In filamentary form as a network within the niobium body, the individual strands or filaments will likewise have a cross section generally somewhat less than the London penetration depth, as given above.

In accordance with one of the principal discoveries that are generally set forth above, aluminum is essentially the full function equivalent of tin in the new method and production of this invention. Accordingly, aluminum may be used in place of tin in the production of articles and bodies having the new properties previously described herein and the method of such production may take either the form of vapor deposition or molten dipping or a combination of both processes in a duplex method leading to the production of bodies having superior high current carrying capacity. Those skilled in the art will understand that the time and temperature ranges previously given for tin in these various operations will differ from those representing practical limits as well as the optimum conditions in aluminum operations. Specifically, temperatures in the vapor deposition of aluminum will be in the range from 1000° C. to 1500° C. with the optimum at 1200° C. Likewise, in the immersion coating method, the temperature range will be from 1000° C. to 1500° C. with the optimum at 1200° C. The times will, however, be 50 hours at 1000° C. to 1500° C. with the preference being 10 to 20 hours at 1200° C. Other circumstances of the process such as the vessels used and the work-piece preparation, the vessel degassing step, and the like may be as set forth herein above except that on aluminum resistant vessel be used.

The following non-limiting examples are offered to illustrate for the benefit of those skilled in the art the precise nature of the invention as it has been or may be carried out in practice.

*Example I*

In the production of the article of FIG. 1, a niobium wire 10 of a diameter 0.032 inch and containing 0.75 percent zirconium was manually cleaned with sandpaper and a benzene-soaked cloth so that all oxide, organic material, loose particles and dirt were removed from the surface of the wire. This cold working operation resulted in the formation of a very fine network of interconnecting pores or dislocation "pipes" 11. The wire was then placed in a clean quartz tube about half filled with tin in the form of small chips which had been thoroughly cleaned using an etchant consisting of eight parts (by volume) glycerine, one part (by volume) glacial acetic acid and one part (by volume) concentrated nitric acid, after which it was rinsed thoroughly in distilled water. The assembly was put under a vacuum of $10^{-6}$ mm. of mercury and degassed by means of an oven, the temperature of which was maintained at 200° C. for the three-hour period of the degassing operation. The temperature of the oven was raised to 250° C. and held there until the tin chips had all melted. Immediately thereafter, the tube was sealed and placed in a furnace where the temperature of the assembly was quickly raised to 960° C. and held at that level for one hour and then was removed from the furnace and while still sealed, was cooled in air to less than 100° C. The tube was opened and the wire was removed and separated from the mass of tin frozen around it and then subjected to tests. This separation of coated wire was accomplished by immersing the tube containing the frozen mass in a fluid bath, such as silicone oil or molten tin, at a temperature of about 240° C. to raise the temperature of the tin mass frozen on the niobium wire to just above the melting point of tin. The wire and adhering tin coating were then withdrawn from the resulting molten tin. The wire, at 4.2° K., proved to have a current carrying capacity of 76 amperes in a 17 kilo oersted transverse field, which compared with a current valve in the initial wire of less than about 0.01 ampere, at 4.2° K., in the same field. Further, this wire carried, at 4.2° K., 60 amperes in a pulsed transverse field of 100 kilo oersteds, and carried 40 amperes at about 190 kilo oersteds.

As shown in FIG. 1, wire 10 had a filamentary network 12 formed through the deposition of tin within the interconnecting pipes 11 in the outer portion of the wire. Additionally, a thin coating 13 of tin remained on the wire after removal from the mass.

*Example II*

In another operation involving the present vapor deposition method, a ribbon of niobium 0.005 inch by 1/16 inch wide containing 0.75 percent zirconium was cleaned as described in Example I and then hung on a niobium wire support in a clean quartz tube containing clean tin chips in an amount insufficient to produce a melt level high enough to reach the suspended ribbon. After evacuating and degassing the tube as described above, the tube was sealed and placed in a furnace where it was subjected to a temperature of 960° C. for 16 hours. The tube was then removed from the furnace and the tube and its contents were air cooled to a temperature of about 100° C., whereupon the tube was opened and the ribbon was removed and tested. The ribbon proved to carry 36 amperes, at 4.2° K., in a 17 kilo oersted field. The operation was then repeated, the ribbon being replaced in the tube, and following evacuation and degassing and sealing of the tube, the tube was placed in the furnace where it was subjected to a temperature of 960° C. for 16 hours. Again, the ribbon was not contacted by molten tin but only by tin vapor. At the end of the 16-hour second firing period, the tube was removed from the furnace, tube and its contents cooled in air to 100° C. and the tube was then opened, the ribbon removed and again tested as described above. This time the ribbon carried more than 100 amperes of current at 4.2° K. in a 17 kilo oersted transverse field.

*Example III*

In still another operation leading to the production of the article illustrated in FIG. 2, a niobium wire 15 of 0.032 inch diameter following cleaning as described in Example II may be placed in a clean quartz tube containing clean tin chips, also as described above. Again, the cold working of the wire in the cleaning operation would result in the opening or creation of dislocation "pipes" 16. The vacuum and degassing operation of Example I may be carried out, then the quartz tube sealed and placed in an oven where it may be subjected to a temperature of 960° C. for 20 hours, air cooled, and then opened and the wire removed after the manner set out in Example I. Wire 15 is shown at this stage in FIG. 2, which illustrates the presence of a filamentary network of superconducting material 17 partially filling "pipes" 16.

*Example IV*

In the operation illustrated in FIG. 3 involving the use of another niobium wire 0.032 inch in diameter, cleaning step 20 previously described herein was carried out and the wire was contacted with, i.e., immersed in, a melt of tin 21 in a quartz tube, all as set forth above. After 10 minutes in the melt at 960° C., the wire and the molten tin and container were rapidly cooled, 22, (in air) to 100° C. and the tube seal was broken and the coated wire removed. This wire was wound, 23, as a coil on a stainles steel mandrel to produce a high critical magnetic field solenoid, 24. This unit was then heat treated, 25, at 900° C. to 1000° C. for about 15 minutes in an atmosphere of argon saturated with tin vapor. In this heat treatment step, care is exercised to insure presence of an adequate supply of tin, either in the atmosphere or on the surface of the wire so that tin is not lost from the superconducting films or filament structures of the wire in any substantial degree. During this step of the process, the filamentary elements formed in the initial firing stage and broken during the winding operation are repaired and new filamentary elements are formed with the result of further diffusion of tin through the dislocation "pipes" with resulting packing of the unit volume of the niobium wire with super-current carrying threads or filamentary elements. Thereafter, the finished coil was cooled, 26, and ready for use.

*Example V*

In another operation the same as generally set out in Example IV, a solenoid wire may be produced and wound around a quartz mandrel, but instead of heat treating the resulting solenoid unit in a tin-saturated atmosphere, the unit is immersed in a body of molten tin, the temperature of which is maintained at 900° C. to 1000° C. The temperature of the molten tin is allowed to fall over a period approximately two hours to the point where the tin freezes in a block around the coil to provide physical strength for the assembly and to insulated structure during operations at 4.2° K.

*Example VI*

In an operation similar to that of Example III, wires of 0.001 inch diameter of niobium containing 0.75 percent zirconium may be tinned and then after cooling, assembled together in the form of a cable of diameter approximating 0.012 inch and this cable used to wind the solenoid, which may then be heated as a unit in an atmosphere of argon saturated with tin vapor.

*Example VII*

As a variation of the method of Example I, small tubes of niobium may be used in place of wires in order to maximize the surface area of the resulting superconductive body. The procedures set forth in detail in Example I may be advantageously carried out in accomplishing this result.

*Example VIII*

Using suitable equipment, a non-superconducting substrate such as tungsten wire may be used in accordance with this invention, a shell of high current-carrying capacity being deposited as a continuous film on the tungsten wire by running the wire through molten niobium under inert atmosphere and then exposing the coated wire to tin vapor saturated atmosphere at a temperature preferably of 960° C. for 24 hours. As a variation, the niobium-coated tungsten wire may be immersed in molten tin at a temperature of 960° C. for a period of 30 seconds.

Having thus described this invention in such full, clear, concise, and exact terms as to enable any person skilled in the art to which it apertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, part of the specifically described embodiments of the invention may be made without departing from the scope of the invention as set forth in what is claimed.

What I claim as new and desire to secure by Letters Patent of the United States is:

1. As an article of manufacture a strand of niobium containing a minor amount of zirconium and containing tin and niobium as a second phase in the form of continuous filamentary network.

2. A wire having as a superconductor a high current carrying capacity and being of $Nb_2Zr$ and a minor amount of tin distributed as a continuous filamentary network through interconnecting pores of the $Nb_2Zr$.

3. A composite body having superconducting properties including a high current carrying capacity which comprises a porous matrix of niobium and a minor amount of zirconium in excess of 1/10% by weight of the niobium and uniformly distributed through the niobium, and a coherent structure of a metal selected from the group consisting of aluminum and tin with niobium as a second phase in the form of a deposit on the matrix, the thickness of the major portion of the coherent structure being less than about 500 Angstroms.

4. A body of niobium containing an amount of zirconium in excess of 1/10% by weight of the niobium and bearing a deposit comprising a metal selected from the group consisting of aluminum and tin.

References Cited by the Examiner

UNITED STATES PATENTS

| | | | |
|---|---|---|---|
| 1,126,484 | 1/1915 | Kirby | 117—114 |
| 1,920,439 | 8/1933 | Steckel | 117—114 |
| 2,215,477 | 9/1940 | Pipkin | 29—193 |
| 2,305,555 | 12/1942 | Peters. | |
| 2,410,717 | 11/1946 | Cox | 29—192 |
| 2,800,772 | 7/1957 | Carroll. | |
| 2,957,232 | 10/1960 | Bartlett | 29—192 |
| 2,958,836 | 11/1960 | McMahon. | |
| 2,991,197 | 7/1961 | Sandoz. | |
| 3,091,556 | 5/1963 | Behrndt | 117—227 X |
| 3,181,936 | 5/1965 | Denny | 29—194 |
| 3,214,249 | 10/1965 | Bean | 29—195 X |

(Other references on following page)

OTHER REFERENCES

"Constitution of Binary Alloys," Hansen, McGraw-Hill Book Company, 1958, pages 1017, 1018, 1022, 1023.

"Superconductivity," by Dr. C. W. Hewlett, General Electric Review, June 1946, pages 19–24.

References Cited by the Applicant

J. Kunzler et al.: Phys. Rev. Letters, vol. 6, No. 3, Feb. 1, 1961, page 89.

HYLAND BIZOT, *Primary Examiner.*